United States Patent [19]

Sidney, Jr. et al.

[11] Patent Number: 5,060,874
[45] Date of Patent: Oct. 29, 1991

[54] CRUSHER

[75] Inventors: George L. Sidney, Jr., Altoona; Arthur D. Walter, Claysburg, both of Pa.

[73] Assignee: McLanahan Corporation, Hollidaysburg, Pa.

[21] Appl. No.: 625,002

[22] Filed: Dec. 10, 1990

Related U.S. Application Data

[62] Division of Ser. No. 568,596, Aug. 16, 1990, Pat. No. 5,027,491.

[51] Int. Cl.$^5$ .............................................. B02C 1/08
[52] U.S. Cl. ..................................... 241/231; 241/234
[58] Field of Search ................. 29/117, 124, 129, 130; 241/227, 230, 293, 37, 231, 234, 101.2; 72/246, 248

[56] References Cited

U.S. PATENT DOCUMENTS

| | | | |
|---|---|---|---|
| 556,187 | 3/1896 | Holland | 241/293 X |
| 1,198,603 | 9/1916 | Tanner | 241/227 |
| 1,670,381 | 5/1928 | Rogers | 29/117 X |
| 1,674,635 | 6/1928 | Burden | 29/117 X |
| 1,681,868 | 8/1928 | McLean | 29/117 X |
| 1,885,241 | 11/1932 | Duckworth | 29/117 X |
| 3,231,205 | 1/1966 | Spangler | 241/294 |
| 3,721,391 | 3/1973 | Lepola | 241/293 |
| 3,761,008 | 9/1973 | Goulder | 279/2 |
| 4,168,807 | 9/1979 | Dibowski et al. | 241/293 |
| 4,222,433 | 9/1980 | Marti et al. | 29/130 X |
| 4,232,834 | 11/1980 | Player et al. | 241/293 |
| 4,339,083 | 7/1982 | Linzberger et al. | 241/37 |
| 4,485,977 | 12/1984 | Silverthorn et al. | 241/230 |
| 4,547,940 | 10/1985 | Bluhm | 29/113 |

FOREIGN PATENT DOCUMENTS

| | | | |
|---|---|---|---|
| 263444 | 9/1913 | Fed. Rep. of Germany | 241/293 |
| 875131 | 7/1949 | Fed. Rep. of Germany | 241/293 |
| 104678 | 6/1942 | Sweden | 241/293 |
| 155434 | 9/1932 | Switzerland | 241/293 |
| 21776 | of 1898 | United Kingdom | 241/293 |

OTHER PUBLICATIONS

H. Reusch, Low Energy Roller Crushers; Feb., 1989; Ball Bearing Journal; pp. 20-24.

Handle GmbH & Co KG Maschinen und Anlagenbau, Brochure.

Primary Examiner—Mark Rosenbaum
Assistant Examiner—Frances Chin
Attorney, Agent, or Firm—Webb, Burden, Ziesenheim & Webb

[57] ABSTRACT

A crusher having a pair of spaced rollers mounted on shafts. One of the rollers is moveable with respect to the other roller and the movement is by a pair of screw jacks in conjunction with a pair of toggle assemblies. The moveable roller is supported by moveable bearing housings at ends of its shaft. The toggle assemblies apply a force to the moveable bearing housings to slide each moveable bearing housing along a bearing support and a track located on each side of the crusher. Each roller comprises a pair of roll hubs mounted on the shaft, an expansion ring and a roll shell. Roll wedges are located between the expansion ring and the roll hubs and the roll wedges are drawn together by bolts to provide a radially outward force on the expansion ring which holds the roll shell in place.

29 Claims, 8 Drawing Sheets

CRUSHER

This is a division of copending application Ser. No. 07/568,596 filed Aug. 16, 1990, now U.S. Pat. No. 5,027,491.

BACKGROUND OF THE INVENTION

1. Field of the Invention

This invention relates generally to crushers, and more particularly, to crushers employing crushing rollers.

Crushers are used throughout industry to reduce materials such as coal, rock, salt, granite, etc. from a large size to a smaller size. Crushers designed for this purpose frequently include a pair of crushing rollers between which the material to be crushed is passed to accomplish the desired size reduction. The crushing rollers generally consist of an outer metal shell mounted on an inner hub. The outer shell will wear at different rates, depending on the type of metal and the material being crushed. As the outer shell wears it must be replaced, sometimes as often as once a month.

Some crushing roll shells are currently shrink-fitted onto roll hubs by heating the shell until it expands, sliding it onto the hub and letting it cool, so that the shell shrinks tightly onto the hub. A problem with this method of mounting roll shells is that the shell may crack when it cools, especially if the shell is made from a hard, high carbon steel. High carbon steels are preferable for crusher roll shells because of the relatively long wear life. In addition to cracking, another problem with the shrink-fitting is that the application of heat to the shell may cause so much stress that the shell loses its uniformity and roundness. In most crushing applications, uniform roundness of the crushing rolls is essential in order to obtain a uniform crushed product.

A second method for attaching crushing roll shells to roll hubs utilizes a tapered wedge and a tapered roll shell. The tapered wedge is pulled longitudinally toward the center of the roller, causing inward radial forces against the roll hub and outward radial forces against the tapered roll shell. The radial forces hold the shell in place, but the tapered surfaces make alignment in both the radial and axial directions difficult. Parallel alignment between crushing rolls is also a critical factor in producing a uniform product. A problem which is common to both mounting methods is the extended time required to replace roll shells.

2. Description of Related Prior Art

Several other crushing roller assemblies are disclosed in the art. Thus, U.S. Pat. No. 1,670,381 discloses a crusher roll which utilizes a plurality of wedges 23 adapted to be arranged in one of a plurality of recesses in a hub 10 to join a crusher roll 19 thereto. When the bolts 26 are tightened, they cause a gripping action between the roll 19 and the hub 10.

U.S. Pat. No. 1,885,241 is directed to a crushing roll having a hub portion 8 which lockably supports an outer roll shell 1 for rotation about a shaft 7. The shell has a flange or shoulder 5 in its inner bore which engages a finger 4 on the core member 3. Bolts 14 and 16 are tightened to cause the core 3 to grip the flange 5 tightly and hold the outer roll shell 1 in place.

U.S. Pat. No. 1,674,635 utilizes a segmented expansion mandrel which expands to grip an outer roll shell 25 when cone-shaped elements 30 and 31 are forced into contact with the inner peripheral surface 10 of the mandrel.

Other roll shell mounting assemblies are disclosed in U.S. Pat. Nos. 1,681,868, 3,231,205, 3,761,008 and 4,547,940. However, none of these assemblies adequately addresses the problems discussed above to satisfy today's crushing application needs.

It is an object of this invention to provide a crusher which supplies uniform crushed product and which has extended roll shell wear life. It is a further object to provide a crusher which promotes quick removal and installation of crushing rollers and crushing roll shells.

SUMMARY OF THE INVENTION

The invention is a crusher having a housing, a pair of rollers, each supported on a shaft which is journaled in the housing, with at least one of the rollers being moveable with respect to the other along the longitudinal axis of the housing. Means for rotating the shafts in opposite directions are included so that material fed between the rollers is crushed.

The crusher includes four bearings, one for supporting each end of each shaft, and a pair of bearing supports, one on each lateral side of the housing. A pair of tie bars is included on the housing, and one tie bar is positioned parallel to and spaced from each bearing support, so that each tie bar defines a track which faces the bearing support.

Each bearing associated with the moveable roller has a moveable bearing housing which is slideable along the longitudinal axis of the housing between the bearing support and the track. The upper surface of the flange supports the moveable bearing housing, and a guide is positioned on the top of the moveable bearing housing for engaging the track. A screw jack is provided for moving each moveable roller, one on each side of the housing. Means for advancing the screw jacks along the longitudinal axis of the housing are provided, and a toggle assembly is positioned between each screw jack and a moveable bearing housing. The screw jacks engage the toggle assemblies and thereby advance the moveable roller along the longitudinal axis of the housing.

Each roller comprises a pair of roll hubs mounted on the central portion of a shaft, and each hub has an external taper on its outer surface. Four shrink discs are also provided, each having an internal taper on its inner surface, and a pair of the shrink discs is positioned within a recess above the inner surface of each roll hub. Four circular wedges are also included having an external taper on their outer surfaces, and one circular wedge is concentrically positioned between each shrink disc and the inner surface of the roll hub. A plurality of shrink disc bolts are included for drawing each pair of shrink discs together and gripping the roll hubs onto the shaft.

A centering ring is mounted between the roll hubs, and an expansion ring, having an internal notch, is mounted radially outward of the roll hubs, the internal notch engaging the centering ring. A roll shell is mounted radially outward of the expansion ring, and a pair of roll wedges having a taper on their inner surfaces are mounted between the roll hubs and the expansion ring. A plurality of roll wedge bolts are provided for drawing the roll wedges together to apply a radially outward force to the expansion ring, thereby holding the roll shell in place.

The features which characterize the invention are pointed out with particularity in the claims annexed to and forming a part of this disclosure. For a better understanding of the invention, its operating advantages and the specific objects attained by its use, reference should be had to the accompanying drawings and descriptive matter in which a preferred embodiment of the invention is illustrated and described. Like reference characters describe like parts throughout the drawings.

DETAILED DESCRIPTION OF THE PREFERRED EMBODIMENTS

Figure 1:
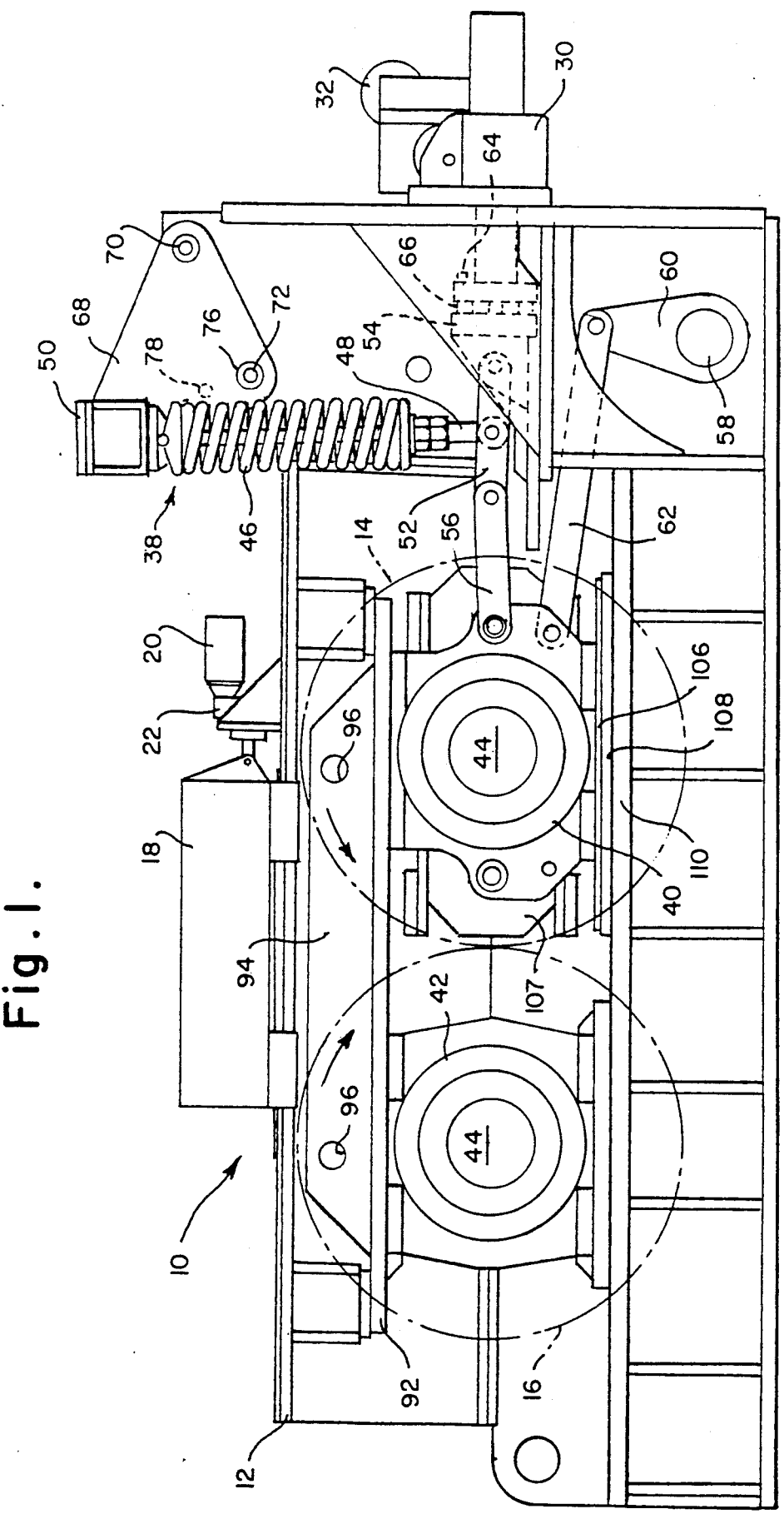
FIG. 1 is a side view of a crushing machine in accordance with the present invention.
Figure 2:
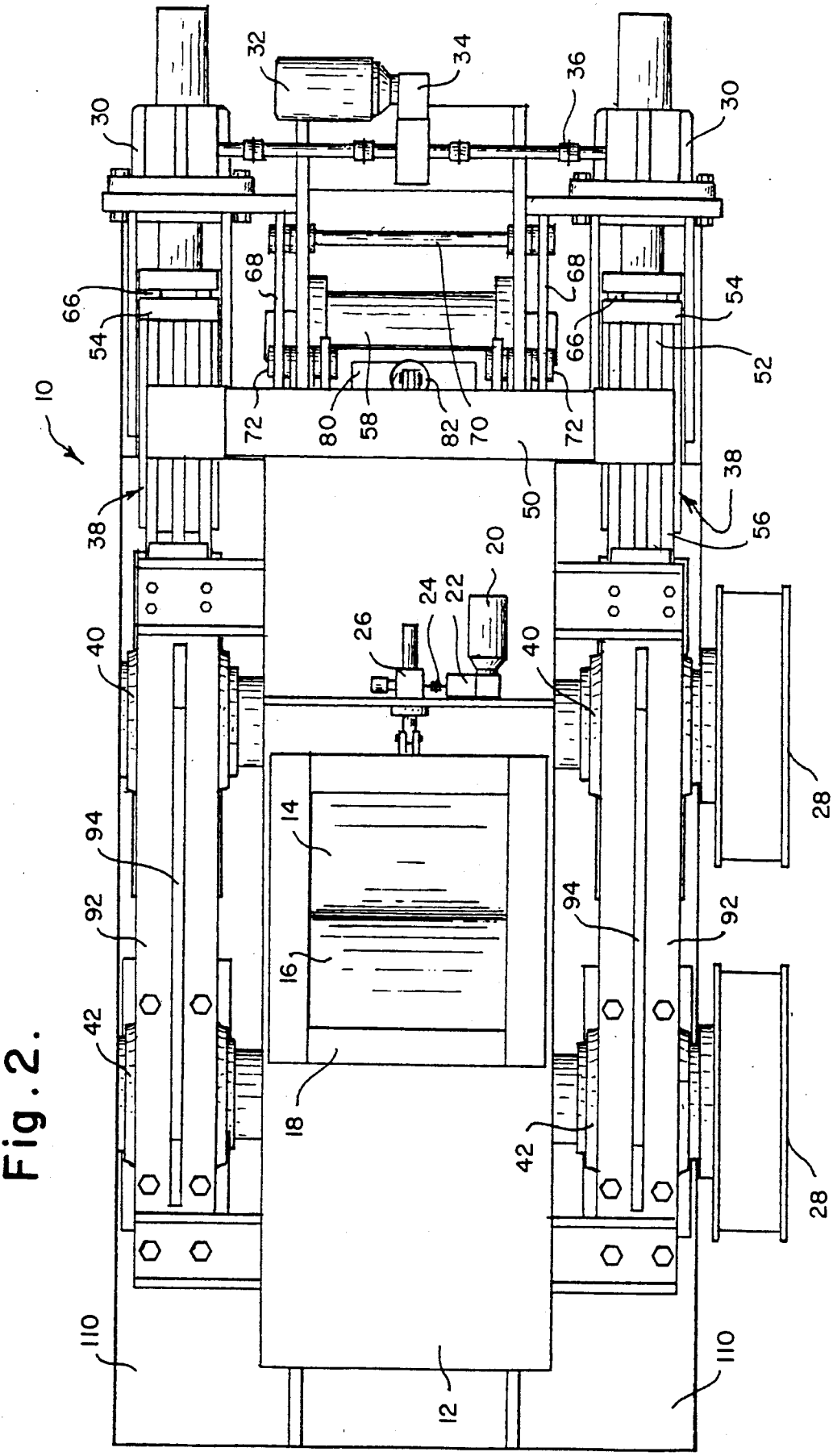
FIG. 2 is a plan view of the crushing machine shown in FIG. 1.

FIGS. 1 and 2 of the drawings show a crusher 10 in accordance with the present invention. The crusher 10 includes a housing 12 and a pair of rollers 14 and 16 between which material is fed for crushing. A hopper 18 is slideably mounted on the top of housing 12 for feeding the material between rollers 14 and 16. The hopper 18 may be adjustably positioned on the housing 12 to insure that the material feed is correctly aligned with the point of tangency between rollers 14 and 16. This is accomplished by an electric adjustment motor 20 in coordination with a gear reducer 22, a coupling 24 and a hopper adjustment screw 26.

Each roller 14 and 16 is belt driven by a fly wheel 28, which may be grooved for "V" belts. Roller 14 is moveable along the longitudinal axis of the crusher 10 by a pair of screw jacks 30 located on opposite sides of the crusher. Similar to the hopper adjustment screw 26 discussed above, the screw jacks 30 may be driven by an electric adjustment motor 32 in coordination with a gear reducer 34 and a plurality of couplings 56. An appropriate adjustment motor is a two-speed, three-phase, 1.53 horsepower, 850-1725 rpm, operating at 460 volts with a 60 Hz frequency.

Figure 9:
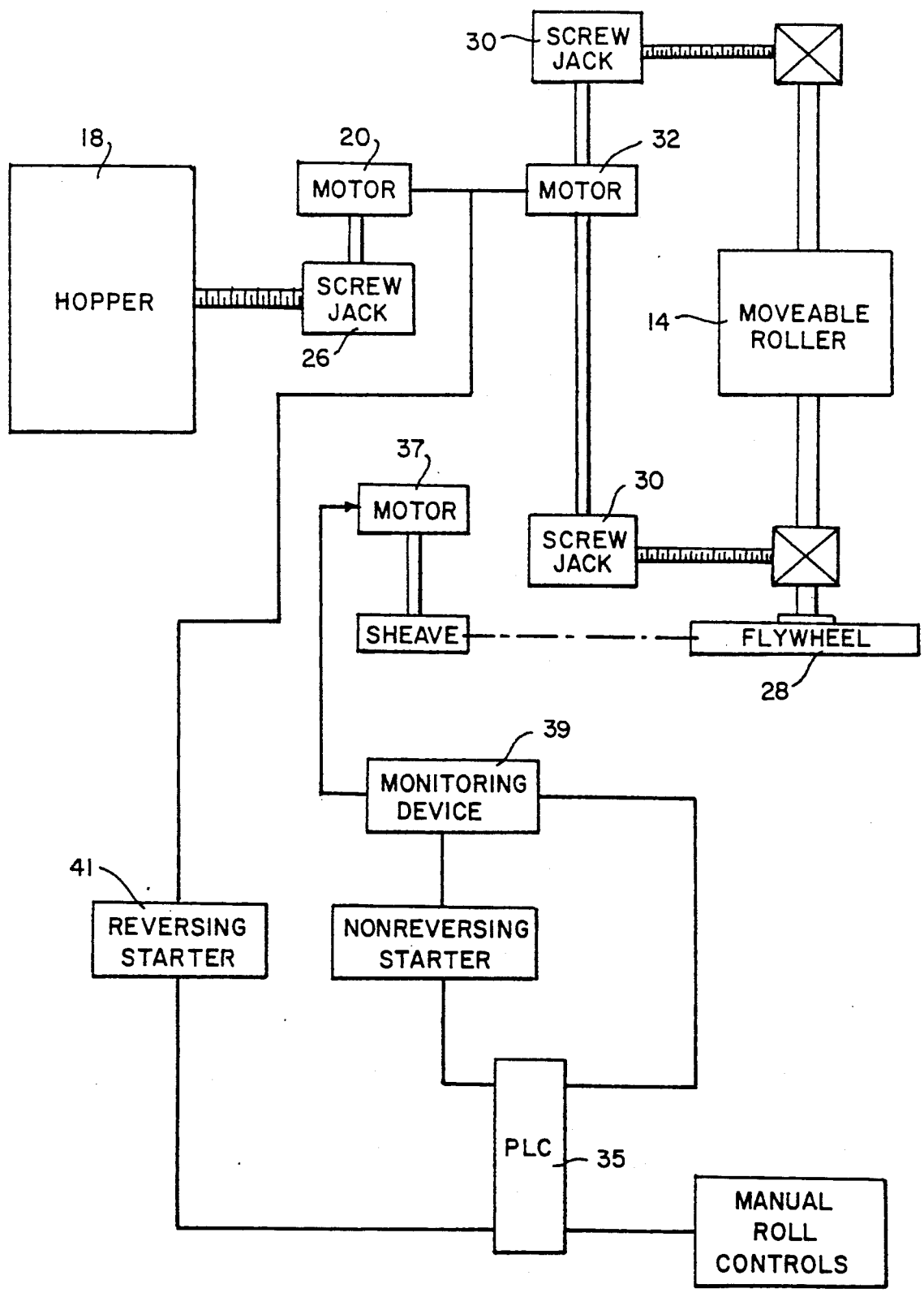
FIG. 9 is a schematic circuit diagram for controlling the movement of the moveable roll assembly and the hopper.

Referring to FIG. 9 of the drawings, the adjustment motor 32 is engaged to adjust the position of moveable roller 14 when the gap between the moveable roller 14 and the stationary roller 16 becomes unacceptably wide. The adjustment motor 32 is connected in an electric circuit with a programmable logic controller 35 ("PLC") and with a motor 37 which drives the fly wheels 28. When rollers 14 and 16 become separated, the power required to rotate the rollers 14 and 16 decreases, and there is a corresponding decrease in amperage required by motor 37. The PLC 35 monitors the amperage to motor 37 via a monitoring device 39 well known to those skilled in the art, and when the amperage decreases below a threshold value, the PLC engages a starter 41 for the adjustment motor 32, and motor 32 moves the moveable roller 14 toward stationary roller 16 until the amperage level rises above the preset threshold value. Additionally, the roller adjustment motor 32 may be electrically coordinated with the hopper adjustment motor 20 so that when the location of moveable roller 14 is adjusted due to wear of rollers 14 and 16, the position of the hopper 18 is also adjusted to maintain proper alignment of the product feed.

FIG. 1 of the drawings shows a toggle assembly 38 and a pair of bearing housings 40 and 42. Bearing housings 40 are moveable whereas bearing housings 42 are stationary. The toggle assembly 38 links each screw jack 30 with its corresponding moveable bearing housing 40. Bearing housings 40 and 42 are positioned on each lateral end of each shaft 44 which supports the rollers 14 and 16.

The toggle assembly 38 consists of a spring 46 mounted on a spring rod 48 which is pivotally connected at its upper and lower ends to a spring rod support 68 and a toggle arm 52, respectively. The toggle arm 52 is pivotally connected at one end to a toggle seat 54 which is fixed to a screw jack 30 in a manner discussed in detail hereinafter. The other end of toggle arm 52 is hingedly connected by a series of fingers to a spacer 56 which is in turn pivotally connected to a moveable bearing housing 40. The main purposes of the toggle assemblies are to provide a resilient, shock-absorbing capability to the moveable roller 14 and to bias the moveable roller toward the stationary roller 16 by applying a force to each moveable bearing housing 40. This capability is important in passing "tramp" material between the rollers 14 and 16 without damaging them. Thus, if tramp material of unusual hardness, such as a piece of metal, is present in the feed, the toggle assemblies 38 will allow the moveable roller 14 to retract and separate slightly from the stationary roller 16 to permit the tramp material to pass through. The compressive force of spring 46 will cause the moveable roller 14 to return to the proper position after the tramp material has passed through.

Figure 3:
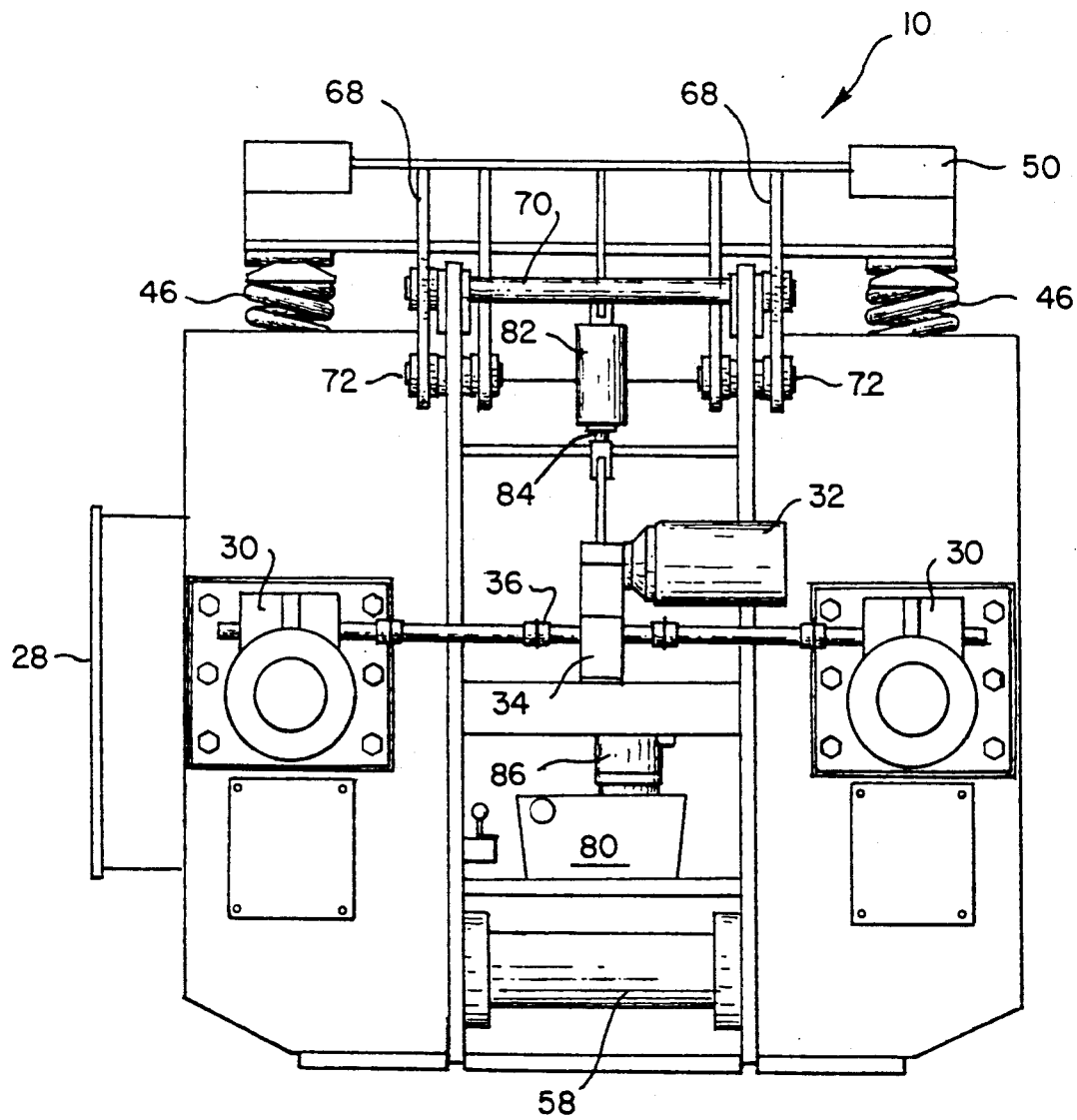
FIG. 3 is a rear view of the crushing machine shown in FIG. 1.

Referring now to FIG. 3 of the drawings in conjunction with FIG. 1, a torsion shaft 58 is located at the rear of the crusher 10, and a fixed arm 60 is mounted on each end thereof. Each fixed arm 60 has a connecting bar 62 pivotally mounted at its upper end, and the other end of each connecting bar 62 is pivotally connected to a moveable bearing housing 40. This arrangement insures that rollers 14 and 16 are maintained parallel to each other when the moveable roller 14 is either adjusted by the roller adjustment motor 32 or displaced by the passage of tramp material between the rollers. In other words, the connecting bars 62 insure that the moveable roller is maintained substantially parallel to the fixed roller at all times.

Each toggle seat 54 is connected to a screw jack 30 by a toggle seat bolt 64. A plurality of Belleville washers 66 are carried on the toggle seat bolt 64 between the toggle seat 54 and the screw jack 30. The Belleville washers 66 are generally in the form of a conventional washer but they have a slight curvature which allows them to be compressed between the toggle seat 54 and the screw jack 30 to provide a dampening effect between the toggle assembly 38 and the screw jack 30 which reduces harmonic frequency vibration problems commonly experienced when the moveable roller 14 is rotated at a certain rpm. The number and configuration of Belleville washers may be varied to suit the particular application according to the amount of dampening required.

A spring frame 68 pivots about a shaft 70 to release compression on the spring 46 when repair or replacement of rollers 14 and 16 is desired. As shown in FIG. 3, the shaft 70 connects each spring frame 68 with the housing 12. The spring frame 68 is held against rotation on the housing 12 by an adjustment pin 72, which is shown in the locked position in FIGS. 1 and 3. When release of spring 46 is desired, adjustment pin 72 is removed and spring frame 68 is rotated by lifting spring rod support 68 to release the tension on the spring 46. When spring frame 68 is rotated, a first bore 76 in the spring frame 68 is realigned with a second bore 78 in the housing 12, as shown in dashed lines in FIG. 1. The adjustment pin 72 is then inserted in bores 76 and 78 as a safety precaution to hold spring frame 68 in the released position.

In order to release and lockdown spring 46, a hydraulic power unit 80 having a hydraulic cylinder 82 and a piston rod 84 is provided on the rear of the crusher 10 as shown in FIG. 3. The piston rod 84 is connected to the spring rod support 68, and movement of piston rod 84 will raise and lower the spring rod support 68 and rotate the spring rod accordingly. The hydraulic power unit 80 may be driven by a suitable electric motor 86, for example, 1 horse power, 1750 rpm, 3 phase, 60 Hz operating on 230/460 volts.

Figure 4:
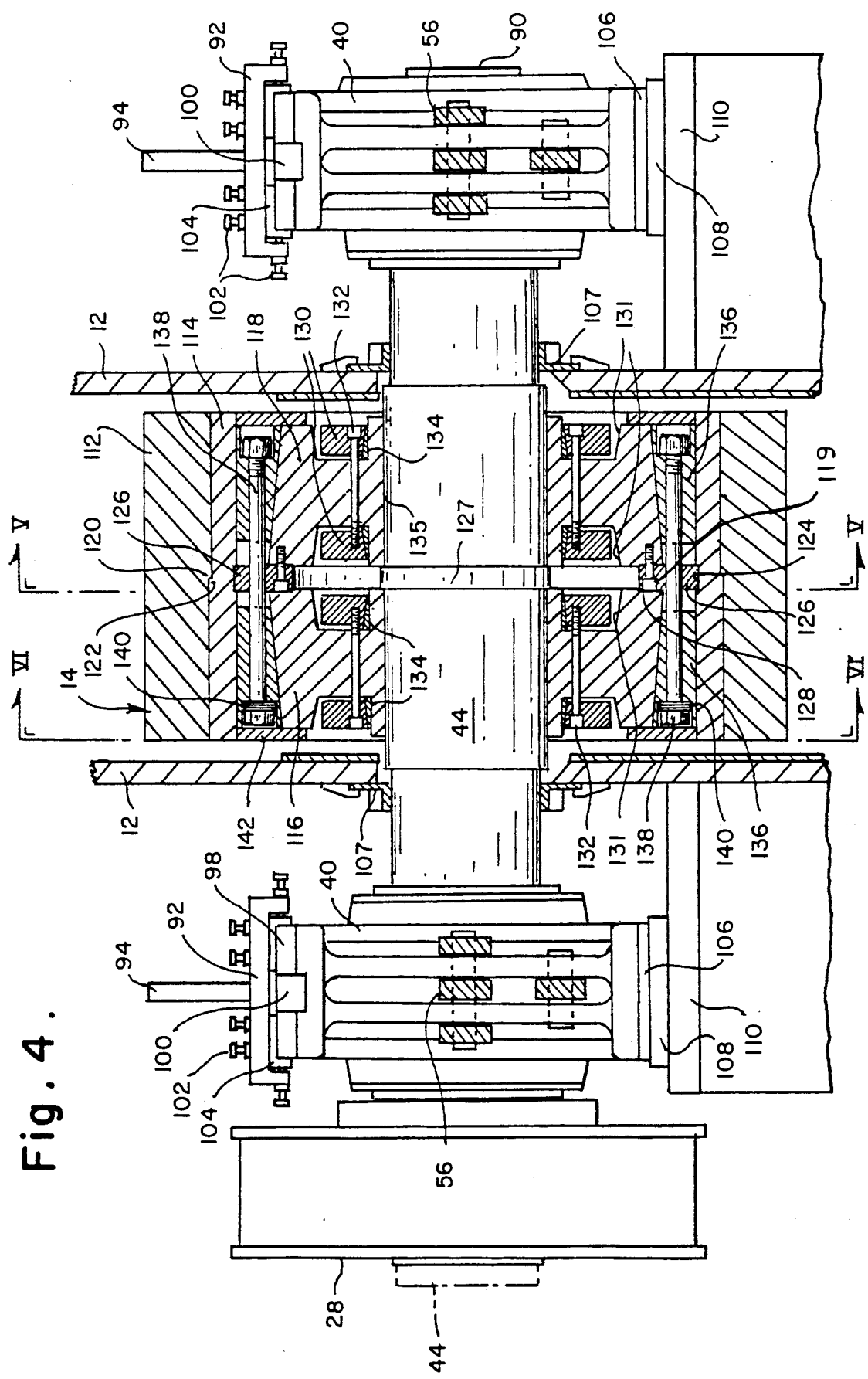
FIG. 4 is a cross-section of a moveable roll assembly in accordance with the present invention.
Figure 8:
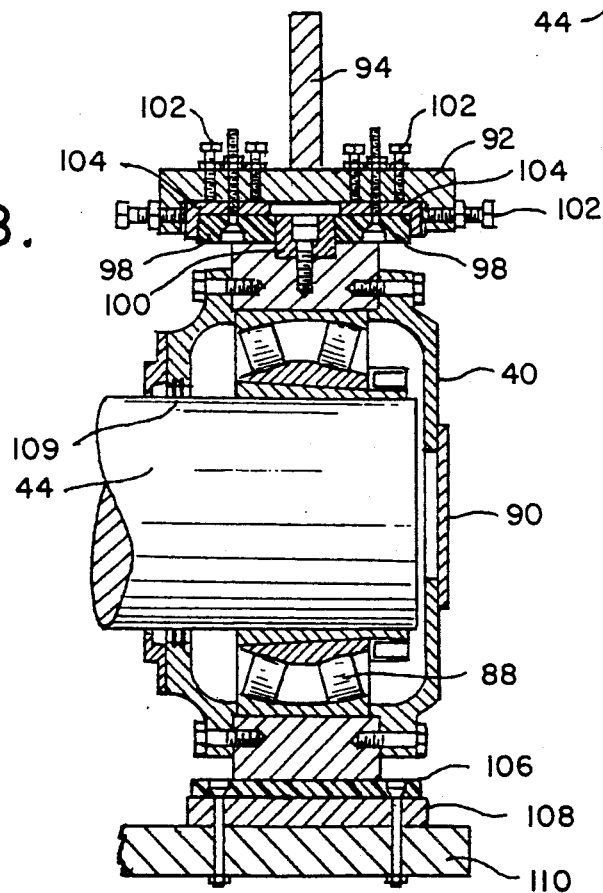
FIG. 8 is an enlarged sectional view of the right moveable bearing shown in FIG. 4.

FIG. 4 is a cross-section of the moveable roller assembly of the present invention. The shaft 44 is shown carrying fly wheel 28, moveable bearing housings 40 and moveable roller 14. Each moveable bearing housing 40 houses a bearing 88 as shown in FIG. 8 which is a mirror image of its counterpart on the opposite end of the shaft 44. It should be noted that the entire roll assembly may be rotated 180 degrees with respect to the housing 12 to place the fly wheel 28 on the opposite side if desired. Additionally, the bearings 88 and the bearing housings 40 are interchangeable, with the only limitation being that the bearing housing opposite the fly wheel 28 must include a closed end cover 90. This interchangeability provides for easier maintenance of the crusher 10.

The moveable bearing housings are slideably captured between a portion of the housing 12 at the bottom and a tie bar 92 at the top. The tie bar 92 includes a raised T-portion 94 with a plurality of holes 96 for lifting the top of housing 12 from the crusher 10. On the underside of tie bar 92, a tie bar liner 98 forms a track in which a guide 100, mounted on the top of each bearing housing 40, may slide. The tie bar liner 98 is made from a high density plastic, such as polypropylene. Each tie bar liner 98 is positioned within tie bar 92 by a plurality of liner support adjustment bolts 102 in conjunction with a liner support angle 104. The bolts 102 are adjusted so that tie bar liner 98 snugly contacts each side of the guide 100, providing a low tolerance track for slideable movement of each bearing housing 40 and bearing 88 along the longitudinal axis of the crusher 10. This feature further provides for uniformity of the crushed product.

The bottom of each bearing housing 40 slides on a wear plate 106 having a base 108, both of which are mounted on a flange 110 extending from housing 12. Each bearing housing 40 slides on top of wear plate 106, and the need for a track is obviated by the presence of connecting bars 62 which are pivotally connected to the lower portion of the bearing housings 40 as discussed above. All alignment of the moveable roller 14 is accomplished by manipulation of bolts 102.

Figure 7:
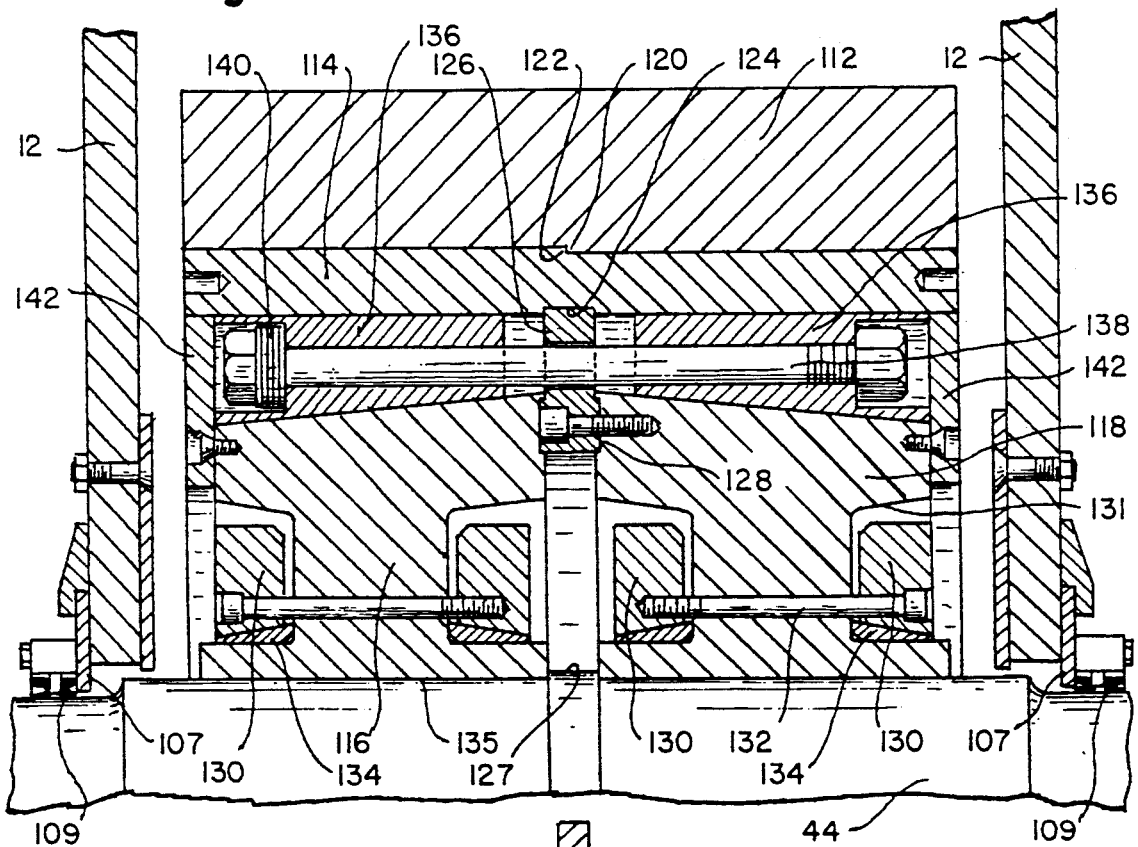
FIG. 7 is an enlarged view of the upper portion of the roller shown in FIG. 4.

Referring to FIGS. 1 and 4, a moveable seal plate 107 is slideably mounted on housing 12 around shaft 44. The moveable seal plate 107 moves in tandem with shaft 44 and encloses the area of housing 12 where shaft 44 has clearance for movement along the longitudinal axis of the housing. Additionally, FIGS. 7 and 8 show a plurality of dust seals 109 which further prevent contamination of moving parts during the crushing operation.

Figure 5:
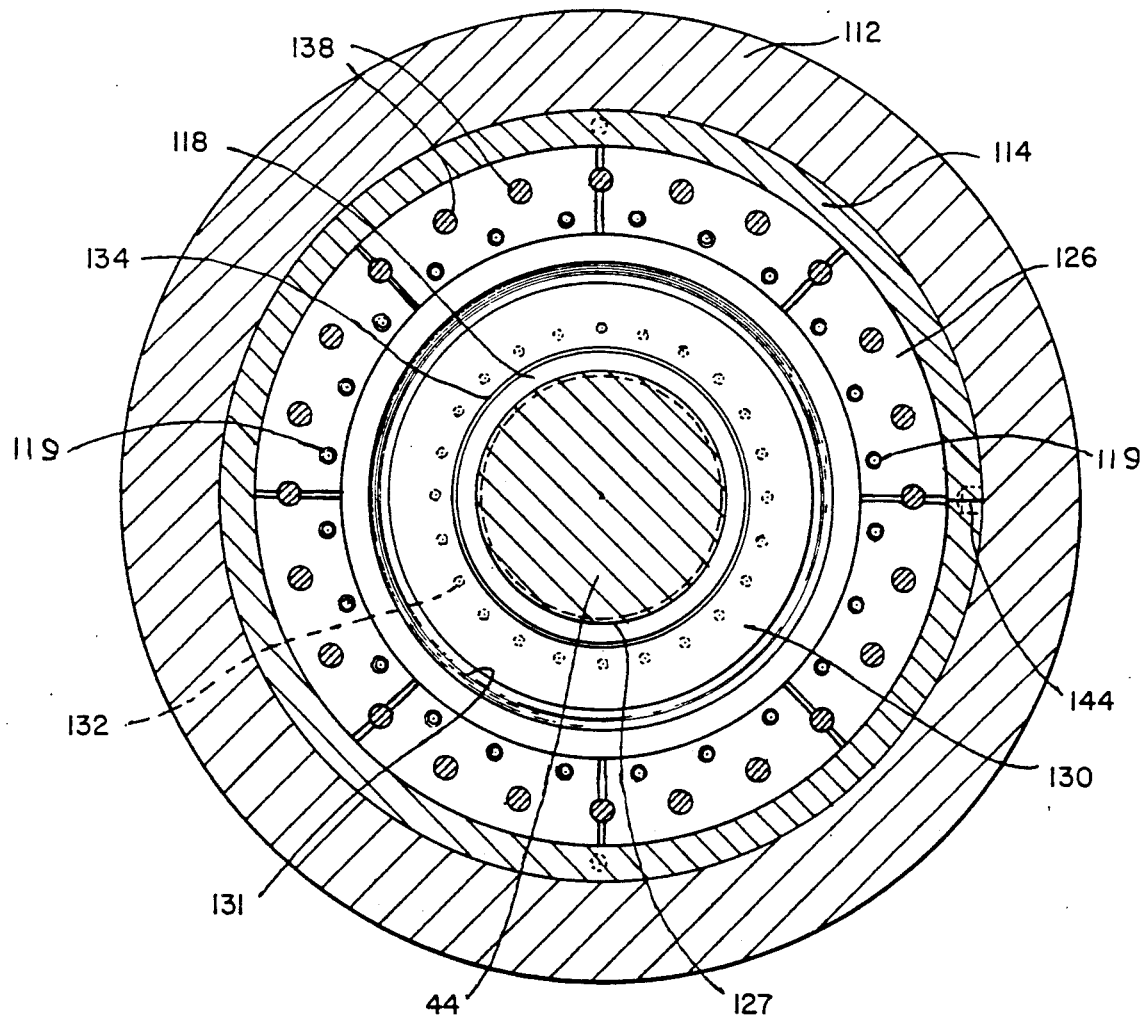
FIG. 5 is a section taken on line V—V of FIG. 4.

The internal structure of rollers 14 and 16 is identical and generally comprises a roll shell 112 with an expansion ring 114 mounted on a pair of roll hubs 116 and 118. The roll hubs 116 and 118 engage the shaft 44 for rotation of moveable roller 14. More specifically, roll shell 112 has an internal shoulder 120 at the approximate center of its bore for alignment with a corresponding external shoulder 122 on the outer surface of expansion ring 114. The expansion ring 114 is in turn keyed via an internal notch 124 to a centering ring 126 which is mounted to roll hub 118. As shown in FIG. 5, centering ring 126 is broken into eight segments, each one separately bolted to roll hub 118. The centering ring 126 prevents axial movement of expansion ring 114 during installation. Likewise, shoulder 122 on the outer surface of expansion ring 114 also centers and prevents lateral movement of roll shell 112. In installation, roll hub 118 is first placed on the shaft 44, and the expansion ring 114 is then held in position above the center of the shaft while each segment of centering ring 126 is keyed into the notch 124 and bolted to roll hub 118 by spaced bolts 119.

The solid shafts 44 are machined to a specified diameter along roll hubs 116 and 118 and to a larger diameter in a central raised portion 127 between the hubs. This allows the hubs 116 and 118 to be easily centered on the shaft 44 and prevents lateral movement of the hubs along the shaft. Each hub 116 and 118 has a machined groove 128 at its outer diameter to keep centering ring 126 in place. Thus, the entire roll assembly is easily aligned about the raised portion 12 of shaft 44.

Each hub also includes a pair of annular shrink discs 130 which are positioned in a recess 131 and are drawn toward each other by a plurality of shrink disc bolts 132 to apply a compressive radial force to the inside of hubs 116 and 118 and cause them to tightly grip shaft 44. More specifically, each shrink disc 130 has an internal taper which meets with a complementary external taper on an annular wedge 134 concentrically positioned between shrink disc 130 and the inner surface 135 of hub 116 and hub 118.

Once hubs 116 and 118 are locked in place on shaft 44, a roll wedge 136 is placed in the space between each hub and the inner surface of expansion ring 114. The roll wedges 136 have an internal taper which meets with a complementary external taper on the outer surface of each hub 116 and 118. The roll wedges 136 are drawn together by a plurality of roll wedge bolts 138, and each bolt includes a plurality of disc springs 140. As the bolts 138 are tightened, roll wedges 136 are drawn together, pushing radially inwardly against the hubs 116 and 118 and outwardly against expansion ring 114. The disc springs 140 are initially compressed by the tightening of bolts 138, but as roll shell 112 wears, disc springs 140 will expand, forcing the roll wedges together to maintain pressure on expansion ring 114. This eliminates the need for frequent tightening of bolts 138 throughout the crushing life of the roll shell 112.

The expansion ring 114 is made from heat treated 1020 plain carbon steel having sufficient elasticity to stretch when roll wedge bolts 138 are tightened and return to its original size when the roll wedge bolts are loosened. The roll wedge bolts 138 are torqued to over 3,200 ft-lbs, which creates enough outwardly directed radial force against expansion ring 114 to cause it to expand against roll shell 112, which is made from a much harder and less elastic steel. The elasticity difference creates a force between expansion ring 114 and roll shell 112 which holds the roll shell in place.

Figure 6:
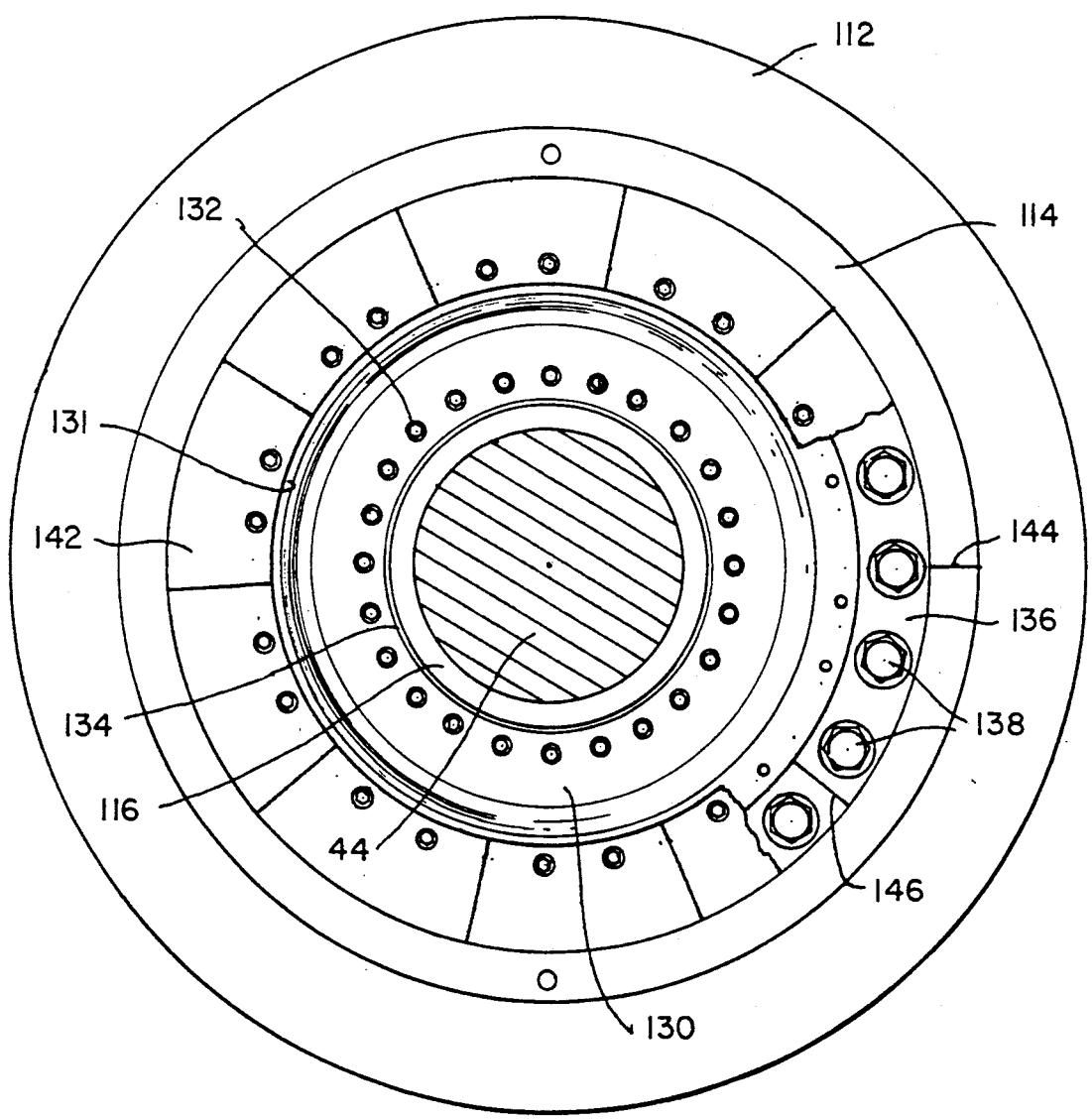
FIG. 6 is a section taken on line VI—VI of FIG. 4.

Referring to FIG. 5 of the drawings, expansion ring 114 may be provided with a clear-through split 144 which enhances its elasticity. The split 144 is placed on only one side of expansion ring 114. The roll wedges 136 may also be provided with a split 146, to enhance their elasticity, as shown in FIG. 6. The split 144 in expansion ring 114 should be sufficiently offset from split 146 in roll wedge 136 to insure that the two will not overlap. Ideally, the splits will be placed 180 degrees from each other. Additionally, a plurality of bolt protectors 142, shown in FIG. 6, are provided on each side of each roller 14 and 16 to prevent roll wedges 136 and roll wedge bolts 138 from becoming worn or damaged during crushing.

Because roll shell 112 is not heated and shrink fitted onto hubs 116 and 118, a steel with a Brinell Hardness Number greater than 350, having longer wear life characteristics, can be used for the roll shell 112. This significantly increases the useful crushing life of the roll shell. The expansion ring 114, with only a shoulder 122 in its outer surface allows roll shell 112 to be worn down to a thickness of about one-half inch without cracking. The expansion ring 114 provides radial support to crushing roll shell 112 along its entire length which prevents the shell from collapsing in the center under the crushing load when it is worn down close to its minimum thickness.

The present invention provides a relatively short changeover time when replacing a worn-out roll shell. Additionally, uniform radial stress is applied to the roll shell by the roll wedges and the roll wedge bolts. This promotes uniform wearing of the roll shells, which in turn insures that the crushed product obtained from the crusher is uniform in size.

The foregoing describes a preferred embodiment of the invention and is given by way of example only. The invention is not limited to any of the specific features described herein, but includes all such variations thereof within the scope of the appended claims.

We claim:

1. A crusher comprising:
   a housing having spaced lateral sides and spaced ends;
   a pair of spaced shafts journaled in said housing, a roller mounted on each of said shafts, at least one of said shafts being a moveable shaft for adjustment along the longitudinal axis of said housing with respect to the other of said shafts;
   means for rotating said shafts and said rollers in opposite directions to crush material fed between said rollers;
   a bearing supporting each end of each of said shafts;
   a bearing support located on each of said lateral sides of said housing;
   a tie bar on each of said lateral sides of said housing parallel to and spaced above said bearing support to define a track facing said bearing support;
   a moveable bearing housing for each bearing associated with said moveable shaft and a guide engaging each of said moveable bearing housings, said moveable bearing housings being slideable along said bearing supports and said track whereby said bearing supports support said moveable bearing housings and said guide engages said track;
   screw jacks for said moveable shaft located on opposite sides of said housing;
   means for advancing said screw jacks relative to the longitudinal axis of said housing; and
   a toggle assembly positioned between each of said screw jacks and each of said moveable bearing housings for applying a force to said moveable bearing housings, each of said screw jacks engaging one of said toggle assemblies whereby said moveable shaft is moved along the longitudinal axis of said housing.

2. The crusher of claim 1 wherein said track includes a tie bar liner, a pair of liner support angles and a plurality of liner support angle bolts for adjusting the tolerances between said track and said guide.

3. The crusher of claim 2 wherein said tie bar liner is a high density plastic material.

4. The crusher of claim 1 including a wear plate made of high density plastic material positioned between each of said moveable bearing housings and said associated bearing support.

5. The crusher of claim 1 including a plurality of Belleville washers positioned between each of said screw jacks and each of said toggle assemblies for reducing vibrations in said crusher.

6. The crusher of claim 1 wherein each of said toggle assemblies comprises a spring mounted on a spring rod which is connected at its upper end to a spring rod support and at its lower end to a toggle arm, said toggle arm pivotally connected at one end to a toggle seat and at the other end to a spacer, said spacer being pivotally connected to said moveable bearing housing, a spring frame pivotally connecting said housing to said spring rod support and said toggle seat being connected to said screw jack.

7. The crusher of claim 6 wherein each of said spring frames includes a spring frame shaft pivotally mounting said spring frame and a first bore radially spaced from said spring frame shaft, and an adjustment pin removably inserted in said first bore to lock said spring frame against rotation.

8. The crusher of claim 7 including a second bore in said housing with which said first bore may be aligned after rotation of said spring frame, whereby said adjustment pin is reinserted to hold said spring frame in a released position.

9. The crusher of claim 8 wherein said spring rod support extends between the upper ends of said spring rods.

10. The crusher of claim 9 including a hydraulic power unit having a hydraulic cylinder and a piston rod, said piston rod being connected to said spring rod support, whereby hydraulic extension of said piston rod from said cylinder forces said spring rod support upwardly and rotates said spring frame from the locked position to the released position.

11. The crusher of claim 1 including a torsion shaft transversely mounted in said housing, said torsion shaft having a fixed arm extending from each end, and a connecting bar between each of said moveable bearing housings and a fixed arm for maintaining said moveable shaft substantially parallel to the other of said shafts.

12. The crusher of claim 1 wherein said means for advancing said screw jacks is a shaft adjustment motor.

13. The crusher of claim 12 wherein said means for rotating the shafts is a motor.

14. The crusher of claim 13 having an electric circuit which includes said motor and said shaft adjustment motor and a programmable logic controller whereby a decrease in amperage demanded by said motor below a threshold value signals said programmable logic controller to engage said shaft adjustment motor to advance said moveable shaft toward the other shaft until the amperage demanded by said motor increases above said threshold value of amperage.

15. The crusher of claim 1 including a hopper slideably mounted on the top of said housing for feeding material between said rollers.

16. The crusher of claim 15 including a hopper adjustment motor for moving said hopper along the longitudinal axis of said housing.

17. The crusher of claim 16 wherein said means for advancing said screw jacks is a shaft adjustment motor.

18. The crusher of claim 17 including control means for said shaft adjustment motor and said hopper adjustment motor whereby adjustment of said moveable shaft by said shaft adjustment motor is accompanied by adjustment of said hopper to maintain proper alignment of said hopper and said rollers.

19. The crusher of claim 1 wherein one of said shafts is longitudinally moveable and the other of said shafts is longitudinally stationary.

20. The crusher of claim 1 wherein said tie bar includes a vertical T-portion having a plurality of holes therein for lifting the top of said housing from said crusher.

21. The crusher of claim 1 wherein each of said rollers comprises a pair of roll hubs mounted on the central portion of said shaft, each of said hubs having an external taper on its outer surface, a plurality of shrink discs having an internal taper on the inner surface positioned within a recess radially spaced from the inner surface of each of said roll hubs, a plurality of circular wedges having an external taper on their outer surface concentrically positioned between each shrink disc and the inner surface of said roll hub, a plurality of shrink disc bolts for drawing pairs of shrink discs together to grip said roll hub onto said shaft, a centering ring mounted between said roll hubs, an expansion ring having an internal notch mounted radially outward of said roll hubs, said internal notch engaging said centering ring, a roll shell mounted radially outward of said expansion ring, a pair of roll wedges having an internal taper on their inner surfaces, each of said roll wedges mounted between one of said roll hubs and said expansion ring, and a plurality of roll wedge bolts for drawing said roll wedges together and applying a radially outward force to said expansion ring to hold said roll shell in place on said expansion ring.

22. The crusher of claim 21 wherein said shaft has a raised central portion of greater diameter than the rest of said shaft and said roll hubs are positioned adjacent said central portion.

23. The crusher of claim 21 wherein one of said roll hubs is formed with a plurality of tapped blind holes to receive bolts for mounting said centering ring on said one of said roll hubs.

24. The crusher of claim 21 including a plurality of bolt protectors on the exterior ends of each of said rollers to protect said roll wedge bolts from damage during crushing.

25. The crusher of claim 21 wherein said expansion ring has an external shoulder and said roll shell has a complementary internal shoulder which meets said external shoulder for positioning said roll shell on said expansion ring and preventing lateral movement thereof.

26. The crusher of claim 21 wherein each of said expansion ring and said roll wedges has a radial split therein for enhancing elasticity.

27. The crusher of claim 21 wherein said centering ring is composed of a plurality of individual arcuate sections.

28. The crusher of claim 21 including a plurality of disc springs mounted on each of said roll wedge bolts.

29. A crusher comprising:
a housing;
a pair of shafts, each of said shafts journaled in bearings and having a roller mounted thereon, at least one of said shafts being moveable with respect to the other of said shafts along the longitudinal axis of said housing, each of said rollers having a pair of roll hubs mounted on the central portion of the shaft, each of said roll hubs having a taper on its outer surface and a recess spaced radially from the inner surface, a pair of shrink discs positioned within said recesses and each of said shrink discs having a taper on its inner surface, a circular wedge having a taper on the outer surface concentrically positioned between each of said shrink discs and the inner surface of each of said roll hubs, a plurality of shrink disc bolts for drawing each pair of shrink discs together to hold said roll hubs onto said shaft, a centering ring mounted between said roll hubs, an expansion ring having an internal notch mounted radially outward of said roll hubs, said internal notch on said expansion ring receiving said centering ring to position said expansion ring, a roll shell mounted radially outward of said expansion ring and having an inner circumference adapted to contact said expansion ring, a pair of roll wedges having a taper on the inner surfaces mounted between said roll hubs and said expansion ring, and a plurality of roll wedge bolts for drawing said roll wedges together to apply a radially outward force to the inner circumference of said expansion ring to hold said roll shell in place on said expansion ring;
means for rotating said shafts in opposite directions whereby material fed between said rollers is crushed;
said bearings supporting each end of each of said shafts;
bearing supports on each lateral side of said housing;
a tie bar on each lateral side of said housing parallel to and spaced from one of said bearing supports to define a track facing one of said bearing supports;
a moveable bearing housing for each bearing associated with said moveable shaft, a guide for each of said moveable bearing housings, said moveable bearing housings being slideable between said bearing support and said track along the longitudinal axis of said housing whereby said bearing supports support said moveable bearing housings and said guides engage said tracks;
a screw jack for said moveable shaft on each lateral side of said housing;
means for advancing said screw jacks along the longitudinal axis of said housing; and
a toggle assembly between each of said screw jacks and each of said moveable bearing housings for applying a force to said moveable bearing housings, said screw jacks engaging said toggle assemblies to advance said moveable shaft along the longitudinal axis of said housing on said bearing supports.

* * * * *